(12) United States Patent
Rhea et al.

(10) Patent No.: US 7,231,549 B1
(45) Date of Patent: Jun. 12, 2007

(54) METHOD AND APPARATUS FOR PROVIDING ON-DEMAND COMPUTER DIAGNOSTICS

(75) Inventors: Paul Anthony Rhea, Lawrenceville, GA (US); Stefano Righi, Lawrenceville, GA (US)

(73) Assignee: American Megatrends, Inc., Norcross, GA (US)

( * ) Notice: Subject to any disclaimer, the term of this patent is extended or adjusted under 35 U.S.C. 154(b) by 468 days.

(21) Appl. No.: 10/675,175

(22) Filed: Sep. 30, 2003

Related U.S. Application Data

(60) Provisional application No. 60/416,123, filed on Oct. 4, 2002.

(51) Int. Cl.
*G06F 11/00* (2006.01)
(52) U.S. Cl. ........................................ 714/25
(58) Field of Classification Search .................. 714/25
See application file for complete search history.

(56) References Cited

U.S. PATENT DOCUMENTS

| | | | | |
|---|---|---|---|---|
| 4,823,343 A | * | 4/1989 | Takahashi | 714/46 |
| 5,448,722 A | | 9/1995 | Lynne et al. | 706/49 |
| 5,678,002 A | * | 10/1997 | Fawcett et al. | 715/709 |
| 6,065,053 A | * | 5/2000 | Nouri et al. | 709/224 |
| 6,065,136 A | * | 5/2000 | Kuwabara | 714/31 |
| 6,145,088 A | * | 11/2000 | Stevens | 714/2 |
| 6,163,849 A | * | 12/2000 | Nouri et al. | 713/324 |
| 6,175,934 B1 | * | 1/2001 | Hershey et al. | 714/25 |
| 6,189,114 B1 | | 2/2001 | Orr | 714/25 |
| 6,253,163 B1 | * | 6/2001 | Lapie | 702/183 |
| 6,385,739 B1 | * | 5/2002 | Barton et al. | 714/25 |
| 6,434,615 B1 | * | 8/2002 | Dinh et al. | 709/224 |
| 6,446,046 B1 | * | 9/2002 | Gronemeyer et al. | 705/28 |
| 6,480,972 B1 | * | 11/2002 | Cromer et al. | 714/25 |
| 6,487,513 B1 | * | 11/2002 | Eastvold et al. | 702/108 |
| 6,505,144 B2 | * | 1/2003 | Lapie | 702/183 |
| 6,516,427 B1 | * | 2/2003 | Keyes et al. | 714/25 |
| 6,571,236 B1 | * | 5/2003 | Ruppelt | 707/3 |
| 6,611,865 B1 | * | 8/2003 | Perugini et al. | 709/224 |
| 6,633,782 B1 | * | 10/2003 | Schleiss et al. | 700/26 |
| 6,643,798 B2 | * | 11/2003 | Barton et al. | 714/25 |
| 6,650,949 B1 | * | 11/2003 | Fera et al. | 700/79 |
| 6,662,220 B1 | * | 12/2003 | Meyer | 709/223 |
| 6,668,289 B2 | | 12/2003 | Cheng et al. | 710/36 |
| 6,697,969 B1 | * | 2/2004 | Merriam | 714/46 |
| 6,701,364 B1 | * | 3/2004 | Meyer | 709/224 |
| 6,728,887 B1 | * | 4/2004 | Dziekan et al. | 726/3 |
| 6,738,931 B1 | | 5/2004 | Osborn et al. | 714/37 |

(Continued)

*Primary Examiner*—Robert Beausoliel
*Assistant Examiner*—Amine Riad
(74) *Attorney, Agent, or Firm*—Hope Baldauff Hartman, LLC

(57) ABSTRACT

A method and apparatus for providing on-demand computer diagnostics are provided. A control object is retrieved and stored at a client computer that is operative to retrieve a diagnostics module in response to a user request. The control object is also operative to receive a request from a user to execute the diagnostics module and, in response to the request, to determine whether execution of the diagnostics module is authorized. If execution is authorized, the control object is further operational to execute the diagnostics module to perform the requested diagnostic. The diagnostics module may be configured to only execute in response to commands issued by the control object. The control object may also be operative to authorize retrieval and execution of the diagnostics module through communications with a diagnostics server computer.

18 Claims, 15 Drawing Sheets

U.S. PATENT DOCUMENTS

| | | |
|---|---|---|
| 6,785,850 B2 | 8/2004 | Dzoba et al. ................. 714/46 |
| 6,813,587 B2 * | 11/2004 | McIntyre et al. ........... 702/183 |
| 6,813,733 B1 * | 11/2004 | Li et al. ..................... 714/47 |
| 6,826,707 B1 * | 11/2004 | Stevens ........................ 714/2 |
| 6,865,691 B1 * | 3/2005 | Brundridge et al. .......... 714/25 |
| 6,865,696 B2 * | 3/2005 | Lopke ......................... 714/48 |
| 6,892,225 B1 * | 5/2005 | Tu et al. .................... 709/217 |
| 6,918,056 B2 | 7/2005 | Paek ............................ 714/27 |
| 6,944,793 B1 * | 9/2005 | Parker ......................... 714/25 |
| 6,988,055 B1 * | 1/2006 | Rhea et al. ................. 702/186 |
| 7,016,952 B2 * | 3/2006 | Mullen et al. .............. 709/224 |
| 7,017,071 B2 * | 3/2006 | Katayama et al. ............. 714/4 |
| 7,111,318 B2 | 9/2006 | Vitale et al. ................ 725/107 |
| 2001/0054161 A1 | 12/2001 | Wooddruff .................... 714/27 |
| 2002/0026634 A1 | 2/2002 | Shaw ......................... 717/173 |
| 2002/0091966 A1 * | 7/2002 | Barton et al. ................. 714/25 |
| 2002/0100036 A1 | 7/2002 | Moshir et al. .............. 717/173 |
| 2002/0120722 A1 | 8/2002 | Kutaragi et al. ............ 709/220 |
| 2003/0110413 A1 * | 6/2003 | Bernklau-Halvor .......... 714/25 |
| 2004/0153776 A1 | 8/2004 | Rhea et al. .................. 714/25 |
| 2004/0210797 A1 * | 10/2004 | Kimelman et al. ........... 714/25 |

* cited by examiner

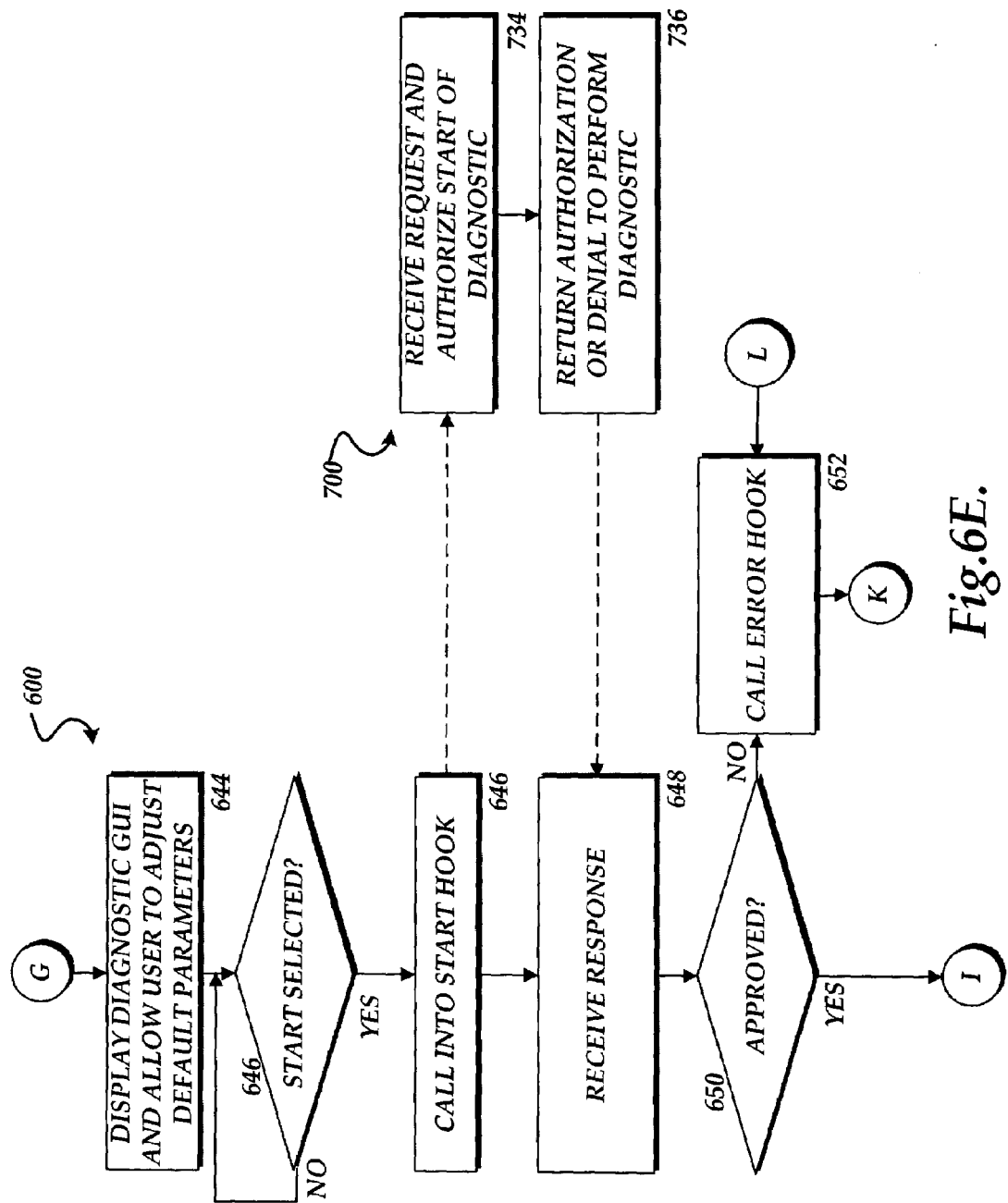

METHOD AND APPARATUS FOR PROVIDING ON-DEMAND COMPUTER DIAGNOSTICS

CROSS REFERENCE TO RELATED APPLICATIONS

This application claims the benefit of U.S. provisional patent application No. 60/416,123 entitled "Diagnostics on Demand" filed on Oct. 4, 2002, which is expressly incorporated herein by reference. This application is related to co-pending U.S. patent applications entitled "Method, System, and Apparatus For Providing A Single Diagnostics Module On-Demand", "Method and Data Structures For Use In Providing On-Demand Computer Diagnostics", and "Method, System, and Apparatus for Providing and Utilizing Server-Side Entry Points For Use in Diagnostics On-Demand Services", which are commonly assigned and which were filed concurrently herewith.

TECHNICAL FIELD

This application is generally related to the field of computer diagnostics. More particularly, this application is related to the field of providing computer diagnostic programs on-demand.

BACKGROUND OF THE INVENTION

As computer systems have become more and more complex, it has become increasingly important to provide comprehensive diagnostic software for identifying malfunctioning components within computer systems. In some cases, computer vendors provide diagnostic software with new computer systems at the time of purchase. Alternatively, users may purchase a complete diagnostic software package at a retail store or through the Internet if they believe that their computer system is malfunctioning. There are, however, drawbacks to both of these methods for delivering diagnostic software to users.

When computer vendors provide diagnostic software with new computer systems at the time of purchase, they typically provide a CD-ROM or other type of media containing the diagnostic program to the user. While this delivery mechanism has been widely used, in cases where a user does not experience problems with their computer and therefore does not need the diagnostic program, the vendor is unnecessarily spending money to provide the CD-ROM to the user. Moreover, by the time a user actually needs the diagnostic program, the contents of the CD-ROM may be outdated due to hardware upgrades, updates to the computer operating system, or upgrades to the diagnostic software itself. While a user might be able to download an updated version of the diagnostic software, this can be very time consuming because the user will typically be required to download a large update to the entire diagnostic software package, rather than just a portion of the diagnostic program to test the malfunctioning hardware. Therefore, providing a CD-ROM or other type of media containing a diagnostic with the computer hardware at the time of purchase is a less than ideal solution for both the computer vendor and the purchaser.

One alternative to providing a diagnostic program with a computer at the time of purchase is to require that a user purchase a diagnostic program when they need to test their computer. This solution, however, is also a problematic solution for users. In particular, comprehensive diagnostic software for testing each of the components within a computer system can be expensive. Moreover, in many cases a user just wants to test a few components in their computer system that may be suspected of malfunctioning. As a result, the user may never utilize many of the tests provided by the diagnostic program. In effect, therefore, the user is paying for software that they may never use. Moreover, if the user purchases a diagnostic software package but does not use the package for a long time, the package may become obsolete, requiring the user to download a large update or to purchase a new version altogether. Therefore, requiring users to purchase comprehensive diagnostic software packages is also not without its drawbacks.

It is with respect to these considerations and others that the present invention has been made.

SUMMARY OF THE INVENTION

In accordance with the present invention, the above and other problems are solved by a method and apparatus for computer diagnostics on-demand ("DOD"). In particular, diagnostics may be provided over a computer network directly in response to a user request. Moreover, individual diagnostics for testing individual components of a computer system may be retrieve and executed on demand without the need to download and install unneeded diagnostics.

In accordance with other aspects, the present invention relates to a method for providing and executing a software diagnostics module for identifying failures and potential failures within a computer system in direct response to a user request. According to the method, a control object is retrieved and stored at a client computer that is operative to retrieve the diagnostics module in response to a user request. The control object is also operative to receive a request from a user to execute the diagnostics module and, in response to the request, to determine whether execution of the diagnostics module is authorized. If execution is authorized, the control object is further operational to execute the diagnostics module. In this manner, the control object allows the retrieval and execution of an individual diagnostics module in a secure manner.

According to other aspects of the method, the diagnostics module is only executable in response to commands issued by the control object. Moreover, the control object is also operative to authorize retrieval and execution of the diagnostics module through communications with a diagnostics server computer. Prior to retrieving diagnostics modules, executing diagnostics modules, and performing other functions, the control object may request permission from the diagnostics server computer to perform these activities. Network addresses at the diagnostics server computer for requesting permission and for performing these functions may be identified to the client computer within a configuration file transmitted from the diagnostics server computer. Moreover, installation, execution, and version information for each of the software files utilized by a particular diagnostics module may be transmitted from the diagnostics server computer to the client computer via a data file. The data file may be utilized by the control object to determine the identities of the files to be retrieved for the requested diagnostic, to determine the minimum number of files needed to perform the requested diagnostic, to determine how the files should be installed, and to ensure that previously installed versions remain up to date. Computer-controlled apparatus and systems may also perform these methods.

The invention may be implemented as a computer process, a computing system or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

BRIEF DESCRIPTION OF THE DRAWINGS

FIGS. 6A-6F show illustrative operational flows for a client computer and a diagnostics server computer utilized in one embodiment of the invention.

DETAILED DESCRIPTION OF THE INVENTION

As described briefly above, embodiments of the present invention provide a method, system, apparatus, and computer-readable medium for providing on demand diagnostic software. Referring now to the figures, in which like numerals represent like elements, several illustrative embodiments of the present invention will be described. It should be appreciated that the embodiments described herein are merely illustrative and that the various embodiments may be combined, other embodiments may be utilized, and structural, logical, and electrical changes may be made without departing from the spirit and scope of the present invention. The following detailed description is, therefore, not to be taken in a limiting sense, and the scope of the present invention is defined only by the appended claims and their equivalents.

Figure 1:
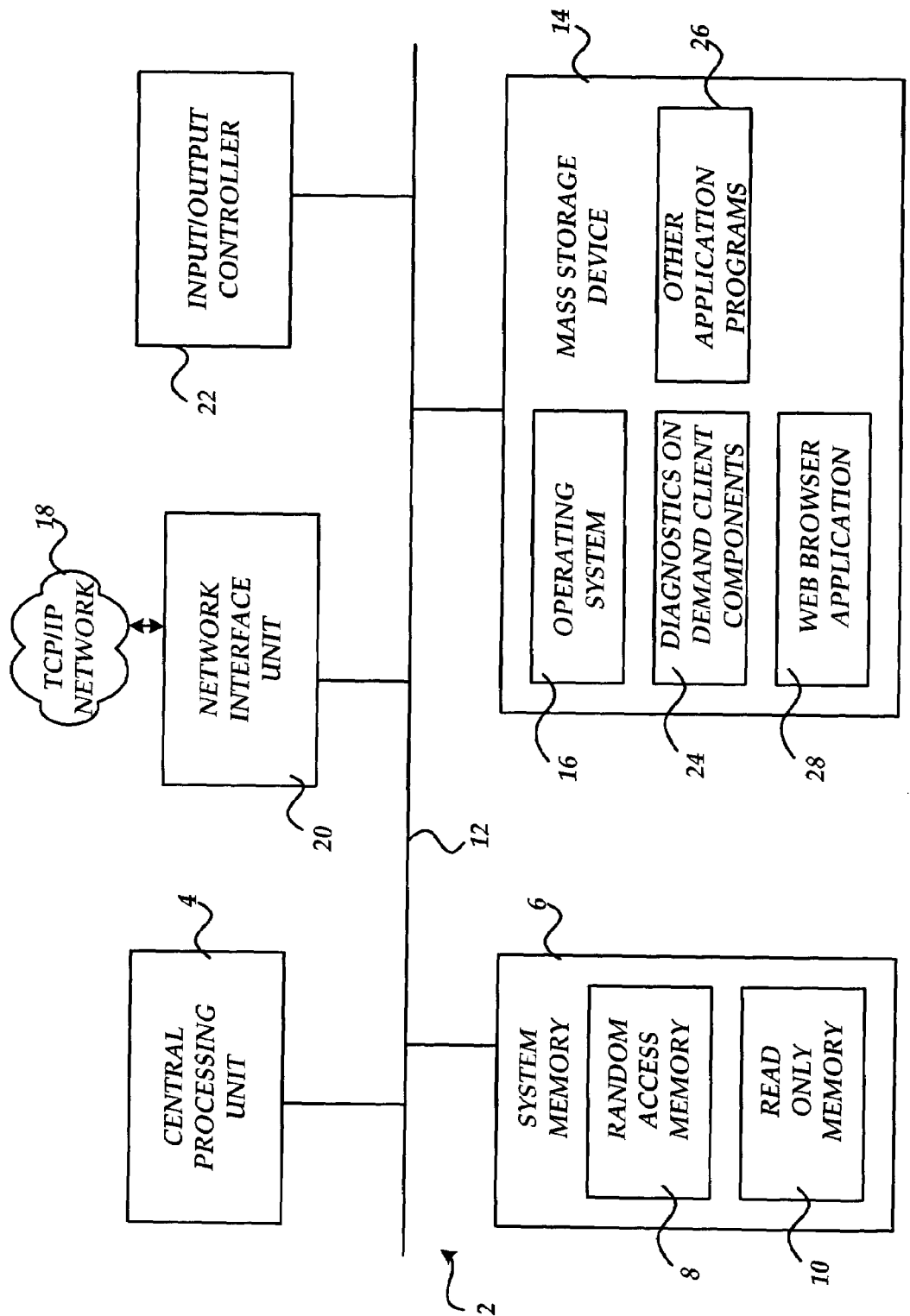
FIG. 1 illustrates the hardware and software components utilized by a client computer in one embodiment of the invention.

Turning now to FIG. 1, illustrative computer architecture for a client computer 2 for use in practicing the various embodiments of the invention will be described. The computer architecture shown in FIG. 1 illustrates a conventional computer system, including a central processing unit 4 ("CPU"), a system memory 6, including a random access memory 8 ("RAM") and a read-only memory ("ROM") 10, and a system bus 12 that couples the memory to the CPU 4.

A basic input/output system containing the basic routines that help to transfer information between elements within the computer, such as during startup, is stored in the ROM 10. The client computer 2 further includes a mass storage device 14 for storing an operating system 16, programs, such as the Web browser application 28, the diagnostics on-demand client components 24, other applications programs 26, and data.

The mass storage device 14 is connected to the CPU 4 through a mass storage controller (not shown) connected to the bus 12. The mass storage device 14 and its associated computer-readable media, provide non-volatile storage for the client computer 2. Although the description of computer-readable media contained herein refers to a mass storage device, such as a hard disk or CD-ROM drive, it should be appreciated by those skilled in the art that computer-readable media can be any available media that can be accessed by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer. Computer storage media may also be referred to herein as computer-readable media or as a computer program product.

Communication media typically embodies computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

According to various embodiments of the invention, the client computer 2 may operate in a networked environment using logical connections to remote computers through a TCP/IP network 18, such as the Internet. The computer 2 may connect to the TCP/IP network 18 through a network interface unit 20 connected to the bus 12. It should be appreciated that the network interface unit 20 may also be utilized to connect to other types of networks and remote computer systems. The computer 2 may also include an input/output controller 22 for receiving and processing input from a number of devices, including a keyboard or mouse (not shown). Similarly, an input/output controller 22 may provide output to a display screen, a printer, or other type of output device.

As mentioned briefly above, a number of program modules and data files may be stored in the mass storage device 14 and RAM 8 of the computer 2, including an operating system 16 suitable for controlling the operation of the computer 2, such as the WINDOWS family of operating systems from MICROSOFT CORPORATION of Redmond, Wash. Other types of suitable operating systems may also be utilized. The mass storage device 14 and RAM 8 may also store one or more executable programs. In particular, the mass storage device 14 and RAM 8 may store a Web browser application 28. As known to those skilled in the art, the Web browser application 28 provides functionality for accessing and viewing Web sites and other content available via the World Wide Web (the "Web"). One example of a Web browser application is the INTERNET EXPLORER Web browser from MICROSOFT CORPORATION.

The mass storage device 14 and the RAM 8 may also store one or more diagnostics on-demand client components 28. As will be described in greater detail below, the diagnostics on-demand client components 28 comprise one or more executable programs for requesting, receiving, and executing individual diagnostic test modules on-demand. Moreover, the diagnostics on-demand client components 28 include one or more diagnostics modules for performing tests on the client computer 2 for diagnosing failures and potential failures within the various systems of the client computer 2. For instance, various modules within the diagnostics on-demand client components 28 may perform tests on the mass storage device 14, the system memory 6, the network interface unit 20, and the other components of the client computer 2. Additional details regarding the specifics of the diagnostics on-demand client components 24 will be provided below with respect to FIG. 3.

Figure 2:
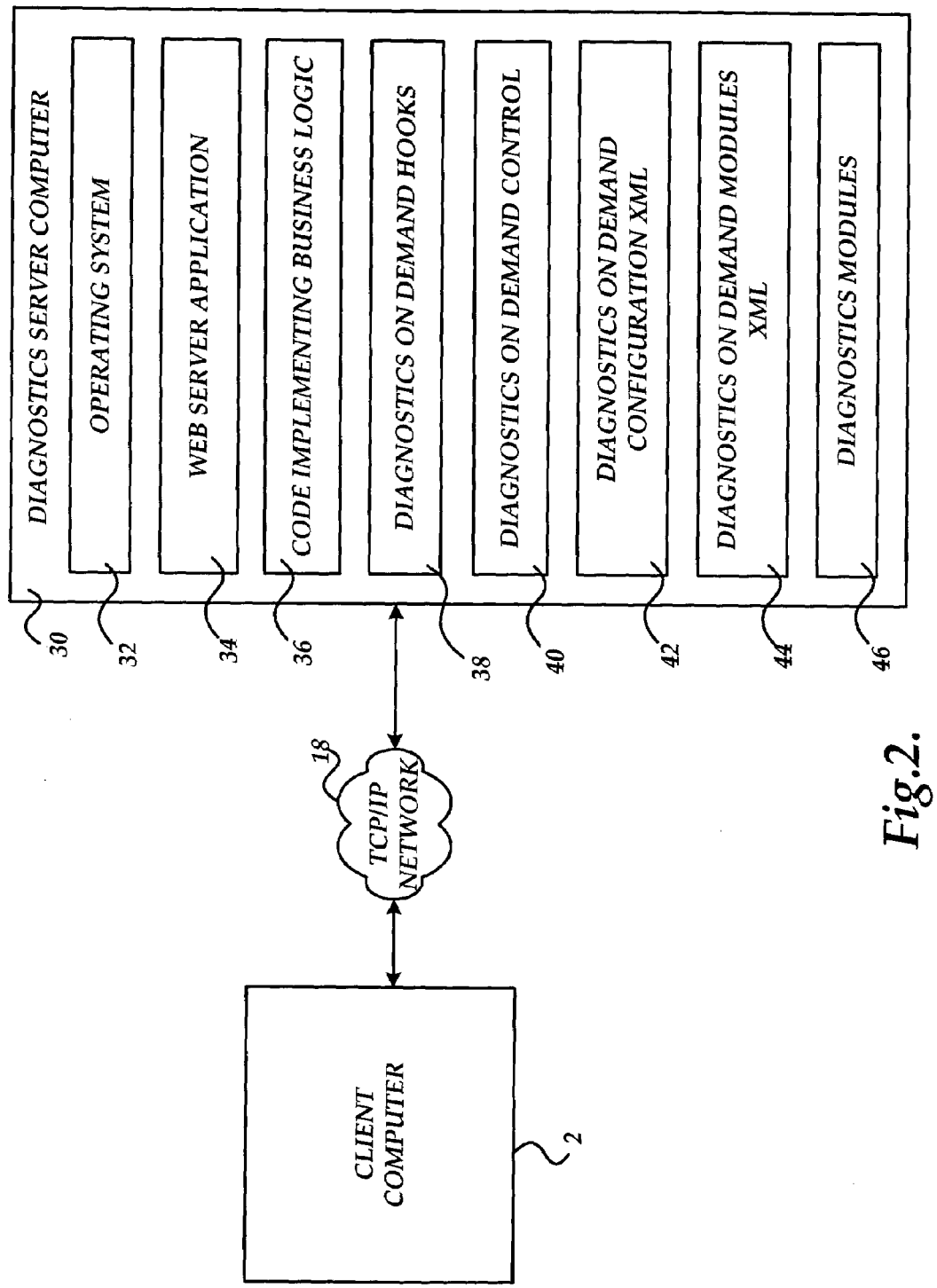
FIG. 2 illustrates a system provided by the present invention, including the software components utilized by a diagnostics server computer in one embodiment of the invention.

Referring now to FIG. 2, additional details will be provided regarding a system utilized in the various embodiments of the invention to provide diagnostics on-demand. In particular, as shown in FIG. 2, the client computer 2 communicates with a diagnostics server computer 30 via a distributed computing network, such as the TCP/IP network 18. According to the various embodiments of the invention, the diagnostics server computer 30 provides functionality for performing diagnostics on-demand on various components of the client computer 2. In order to provide this functionality, the diagnostics server computer 30 utilizes an operating system 32 suitable for controlling the operation of a network server computer, such as the WINDOWS XP PROFESSIONAL operating system from MICROSOFT CORPORATION or the LINUX operating system. In order to provide support for diagnostics on-demand services, the diagnostics computer server 30 also utilizes a Web Server application 34. As known to those skilled in the art, the Web server application 34 is a software program utilized to receive and respond to requests for Web pages, executable components, and other files stored at or accessible to the diagnostics server computer 30.

According to one embodiment of the invention, the diagnostics server computer 30 is operative to provide one or more diagnostics on-demand hooks 38. The diagnostics on-demand hooks, also called entry points herein, are network addresses at which the diagnostics computer server 30 may receive requests from the client computer 2 to perform various types of actions. As will be described in greater detail below with respect to FIG. 4, the hooks, for instance, may provide network addresses at which the client computer 2 may call to download various components, request authorization to perform various functions, and to perform other actions.

The diagnostics computer server 30 may also be operative to store a diagnostics on-demand control 40. As will be described in greater detail below, the diagnostics on-demand control 40 comprises a software component executable within the Web browser application 28 on the client computer 2. The diagnostics on-demand control 40 supervises communication with the diagnostics computer server 30 to retrieve diagnostics modules 46 and to execute these modules on the client computer 2. Additional details regarding the diagnostics on-demand control 40 and its execution on the client computer 2 will be described in greater detail below.

According to one embodiment of the invention, the diagnostics on-demand control 40 may request from the diagnostics computer server 30 a diagnostics on-demand configuration extension markup language ("XML") file 42. The configuration file 42 includes data identifying to the client computer 2 the diagnostics on-demand hooks 38. Additional details regarding the configuration file 42 will be provided in greater detail below with respect to FIG. 4.

The diagnostics computer server 30 may also provide to the client computer 2 a diagnostics on-demand modules XML file 44. The modules file 44 identifies to the client computer 2 the various modules that are available to the client computer 2 for testing hardware and software components therein. Moreover, the modules XML file 44 provides versioning, installation instructions, and other data for use by the client computer 2. Also will be described in greater detail below, the modules XML file 44 may be dynamically generated prior to transmission to the client computer 2. In particular, program code implementing business logic 36, may be executed on the diagnostic server computer 30 to determine the appropriate diagnostics modules 46 to be made available to the client computer 2. For instance, this determination may be made based upon whether a subscription has been paid, whether the user is an authorized user, or other types of business decisions. These types of business decisions may be implemented using any of the well-known server side programming languages, such as PERL.

The diagnostics computer server 30 is also operative to transmit to the client computer 2 one or more diagnostics modules 46. The diagnostics modules 46 comprise files that may be utilized in conjunction with the diagnostics on-demand control 40 to test the hardware and software components of the client computer 2. Individual diagnostics modules 46 may be provided to the client computer 2 for testing single hardware devices within the client computer 2. For instance, a diagnostics module 46 may be provided for testing the mass storage device 14. One advantage of the present invention is that a single diagnostic module 46 can be provided to the client computer 2 upon request of a user for testing a single component within the client computer 2 without retrieving additional and unneeded diagnostic software from the server computer 30. It should be appreciated that the diagnostics modules 46 can be configured for testing either the hardware or software components of the client computer 2. Additional details regarding the operation of the diagnostics modules 46 will be provided below.

Figure 3:
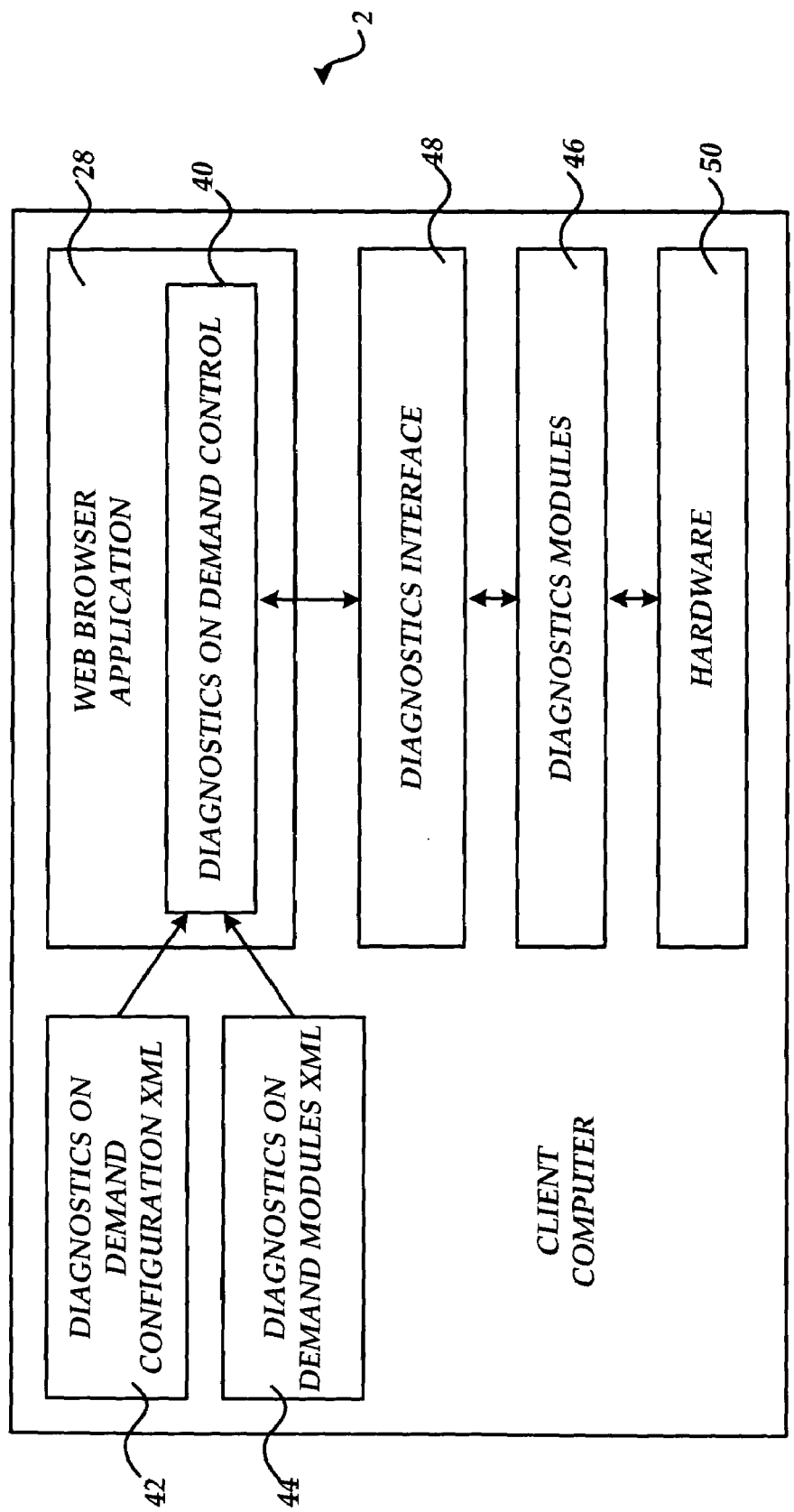
FIG. 3 shows additional software components utilized by a client computer according to one embodiment of the invention.

Turning now to FIG. 3, additional details regarding the software architecture utilized by the client computer 2 to perform diagnostics on-demand will be described. As shown in FIG. 3, the client computer 2 is operative to execute a Web browser application 28. When a diagnostics on-demand control 40 has been retrieved from the diagnostics computer server 30, the diagnostics on-demand control 40 is operative to execute within the browser environment. For instance, the diagnostics on-demand control 40 may be implemented as an ACTIVEX or JAVA container.

As discussed briefly above, the diagnostics on-demand control 40 is operative to retrieve from the diagnostics server computer 30 the diagnostics on-demand configuration XML file 42. The configuration XML file 42 identifies to the diagnostics on-demand control 40 one or more entry points into the server computer 30 at which various functions may be performed. The details of the entry points exposed by the server computer 30 and their use by the diagnostics on-demand control 40 are described in greater detail below with respect to FIG. 4.

The diagnostics on-demand control 40 may also obtain from the diagnostics server computer 30 the diagnostics on-demand modules XML file 44. As discussed briefly above, the modules XML file 44 identifies to the diagnostics on-demand control 40 the diagnostics modules available from the diagnostics computer server 30, along with information identifying the diagnostics modules, identifying the current version of the diagnostics modules, and providing installation instructions, such as whether each file within a particular diagnostics module 46 should be registered in a registry provided by the client computer 2. Additional details regarding the diagnostics on-demand modules XML file 44 will be described in greater detail below with respect to FIGS. 5A-5D.

The diagnostics on-demand control 40 communicates with the diagnostics modules 46 through a diagnostics interface 48. The diagnostics modules 46 communicate directly with the hardware 50 of the client computer 2. By communicating directly with the hardware, the diagnostics modules 46 can identify failures or potential failures within the client computer 2. According to one embodiment of the invention, the diagnostics modules 46 are executable only in response to commands issued by the diagnostics on-demand control 40. This allows the diagnostics modules 46 to be cached on the client computer 2 without fear that the diagnostics modules 46 will be executable by an unauthorized user.

According to various embodiments of the invention, the diagnostics modules 46 comprise one or more modules operative to test a single hardware or software component of the client computer 2. As will be discussed in greater detail below, a single module 46 may comprise one or more files needed to test a single component. The files may be stored in a compressed format on the diagnostics computer server 30 and decompressed at the client computer 2 prior to installation.

Figure 7:
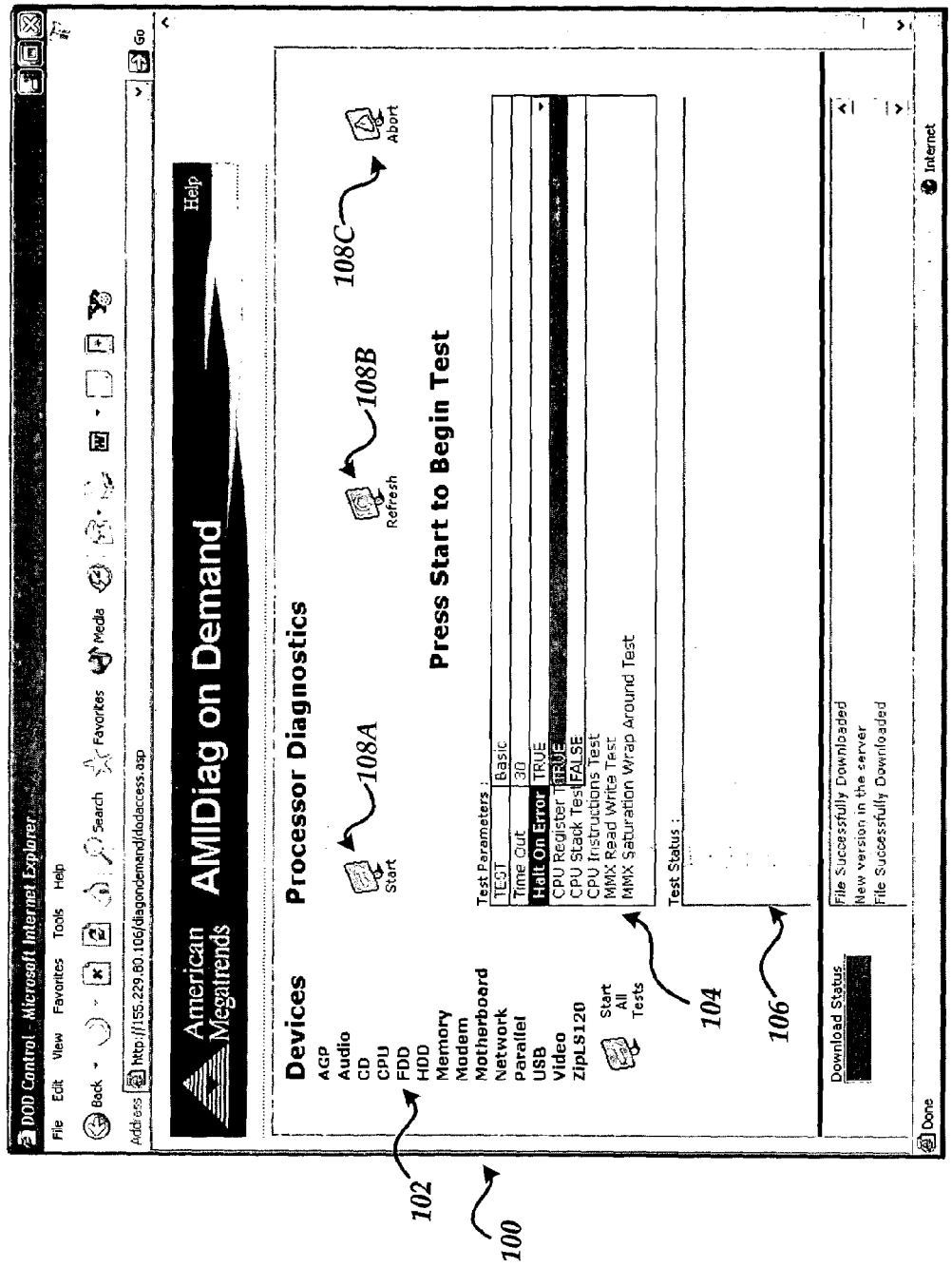
FIG. 7 shows an illustrative screen display provided by a Web browser application in communication with a diagnostics server computer in one embodiment of the present invention.

Referring now to FIGS. 3 and 7, an illustrative screen display 100 provided by a Web browser application 28 when executing a diagnostics on-demand control 40 will be described. The screen display 100 illustrates a standard display provided by the Web browser application 28. The screen display 100 includes a Web page display generated by the diagnostics computer server 30. In particular, portions of the display 100 are generated by the diagnostics on-demand control 40. For instance, a list of devices 102 is provided that allows the user to select a single device upon which a diagnostic test should be performed.

As shown in FIG. 7, audio, compact disc, CPU, floppy disk drive, hard disk drive, and other components are available for testing through the display 100. In response to the selection from the list 102, a number of test parameters 104 may be displayed. The parameters 104 may include default values for each of the parameters. These default values may be edited by a user prior to performing the test. Buttons 108A-108C allow a user to start the diagnostic test, refresh the contents of the display 100, or abort the diagnostic test, respectively.

A window 106 is also provided for providing details regarding the status of the test. Other windows may also include the status of downloads from the diagnostics computer server 30 to the client computer 2. It should be appreciated that the display 100 allows the user to perform diagnostics on the client computer 2 without requiring the user to manually install any software. As will be described in greater detail below, in response to user requests through a display such as the display 100, the necessary components for testing selected hardware or software devices within a client computer 2 may be obtained from the diagnostics computer server 30 and executed within the diagnostics on-demand control 40. Additional details regarding this process are provided below.

Figure 4:
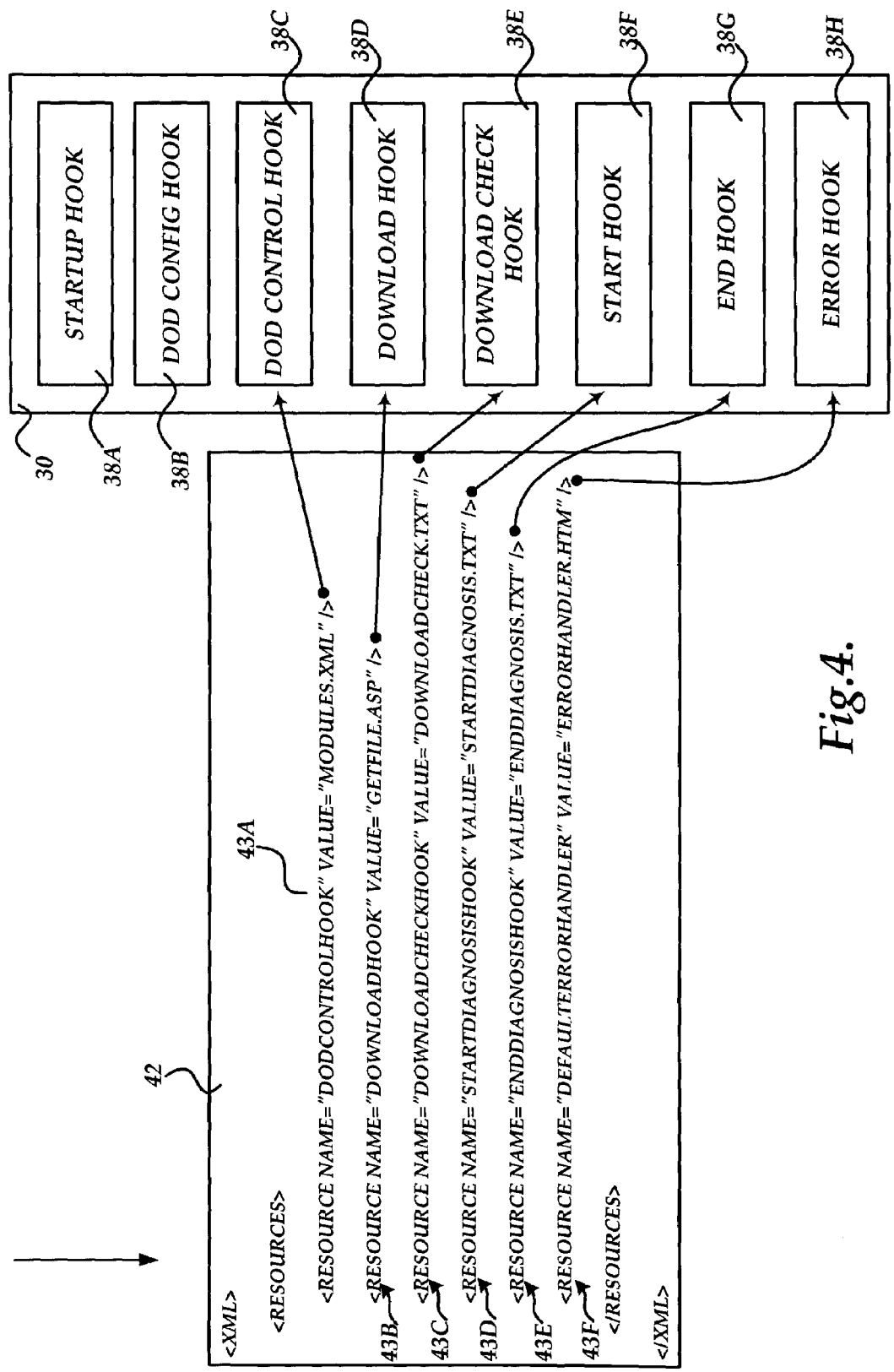
FIG. 4 illustrates the contents of a configuration file utilized by a client computer in one embodiment along with several software components utilized by a diagnostics server computer in an embodiment of the invention.

Referring now to FIG. 4, additional details regarding the contents and use of the configuration file 42 will be described. As shown in FIG. 4, the configuration file 42 includes a number of data fields identifying entry points, also called hooks herein, available at the server computer 30. In order to obtain the contents of the configuration file 42, the client computer 2 is operative to obtain from the server computer 30 the server name and a unique identifier for the particular session from the start-up hook 38A. The start-up hook 38A comprises a network address at which this information may be obtained. The client computer is also operative to retrieve from the server computer 30 the diagnostics on-demand control 40 and the contents of the configuration file 42. These may be obtained by calling the diagnostics on-demand configuration hook 38B. It should be appreciated that, according to one embodiment of the invention, the start-up hook 38A and the diagnostics on-demand configuration hook 38B comprise network addresses which are predefined.

Once the configuration file 42 has been retrieved by the diagnostics on-demand control 40, the diagnostics on-demand control 40 may use its contents to perform various functions. In particular, as is shown in FIG. 4, the configuration file 42 may include a first data field 43A. The data field 43A specifies a network address at the server computer 30 for retrieving a data file that identifies one or more diagnostics modules available to the diagnostics on-demand control 40. The network address may comprise only the name of the data file. The diagnostics on-demand control hook 38C provided by the server computer provides this functionality. As described briefly above, the modules XML file 44 may be retrieved in response to a call to the diagnostics on-demand control hook 38.

The configuration file 42 also includes a data field 43B that may be utilized by the control 40 for downloading diagnostics modules from the server computer 30. Prior to downloading the diagnostics modules, the contents of the data field 43C may be utilized to obtain authorization from the server computer 30 to download a diagnostics module. Authorization for downloading a diagnostics module is obtained by calling the download check hook 38E. Once authorization has been obtained, the diagnostics modules may be actually downloaded by calling into the download hook 38D.

Prior to beginning the execution of a diagnostics module, the diagnostics on-demand control 40 is also operative to obtain authorization from the server computer 30. In order to obtain authorization from the server computer 30 to begin the execution of a diagnostics module, the control 40 calls the network address identified in the data field 43D. This call is supported by the start hook 38F provided by the server computer 30. Similarly, when a diagnostic module has finished executing, the control 40 calls into the network address provided in the data field 43C. This call is supported by the end hook 38G provided by the server computer 30. The end hook 38G may be utilized to provide a record regarding the completion of the execution of diagnostics modules, including their success, failure, or information indicating whether they completed successfully or were cancelled by a user.

The configuration file 42 also includes a data field 43F identifying an error hook 38H provided by the server computer 30. The error hook 38H may be called by the control 40 in response to an error occurring during the execution of a diagnostics module, in the authorization process or, at other times during the execution of the control 40. In response to receiving a call at the error hook 38H, the server computer 30 may prepare and present to the user an error display within the window provided by the Web server application 34.

It should be appreciated that the behavior of the software components supporting each of the hooks 38A-38H may be influenced by the business logic 36. In particular, each of the hooks 38A-38H can be configured to respond based upon business oriented decision-making. For instance, each of the hooks may refuse access to the intended functionality if the user associated with the currently executed control 40 has not obtained an up-to-date subscription for the diagnostics on-demand service. Additionally, the hooks 38A-38H may refuse to provide the intended functionality because the current user of the control 40 does not have valid or appropriate access privileges. Other types of business logic may also be utilized to control the behavior of the hooks 38A-38H. These decisions are up to a system administrator responsible for installing and providing the diagnostics on-demand services available through the server computer 30.

Figure 5A:
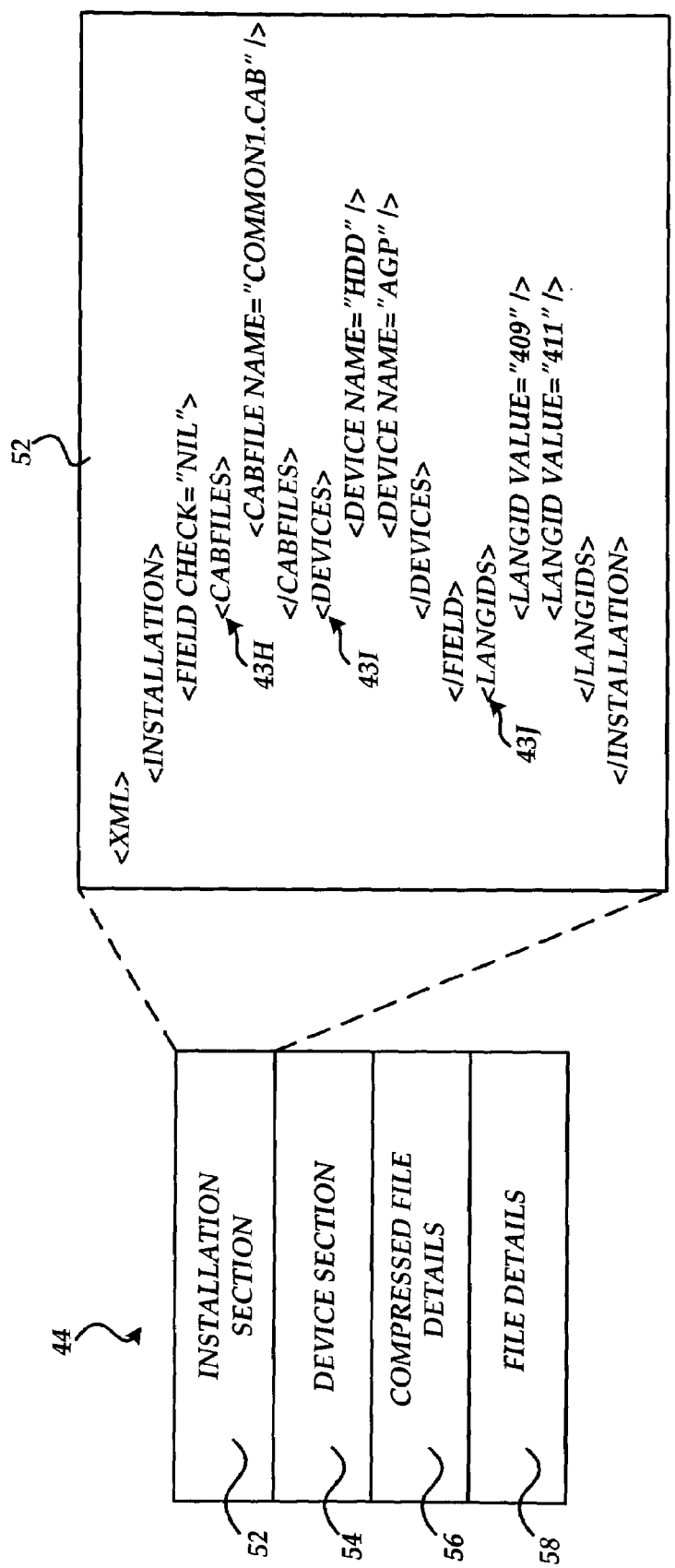
FIGS. 5A-5D show the contents of another configuration file utilized by a client computer in one embodiment of the invention.
Figure 5B:
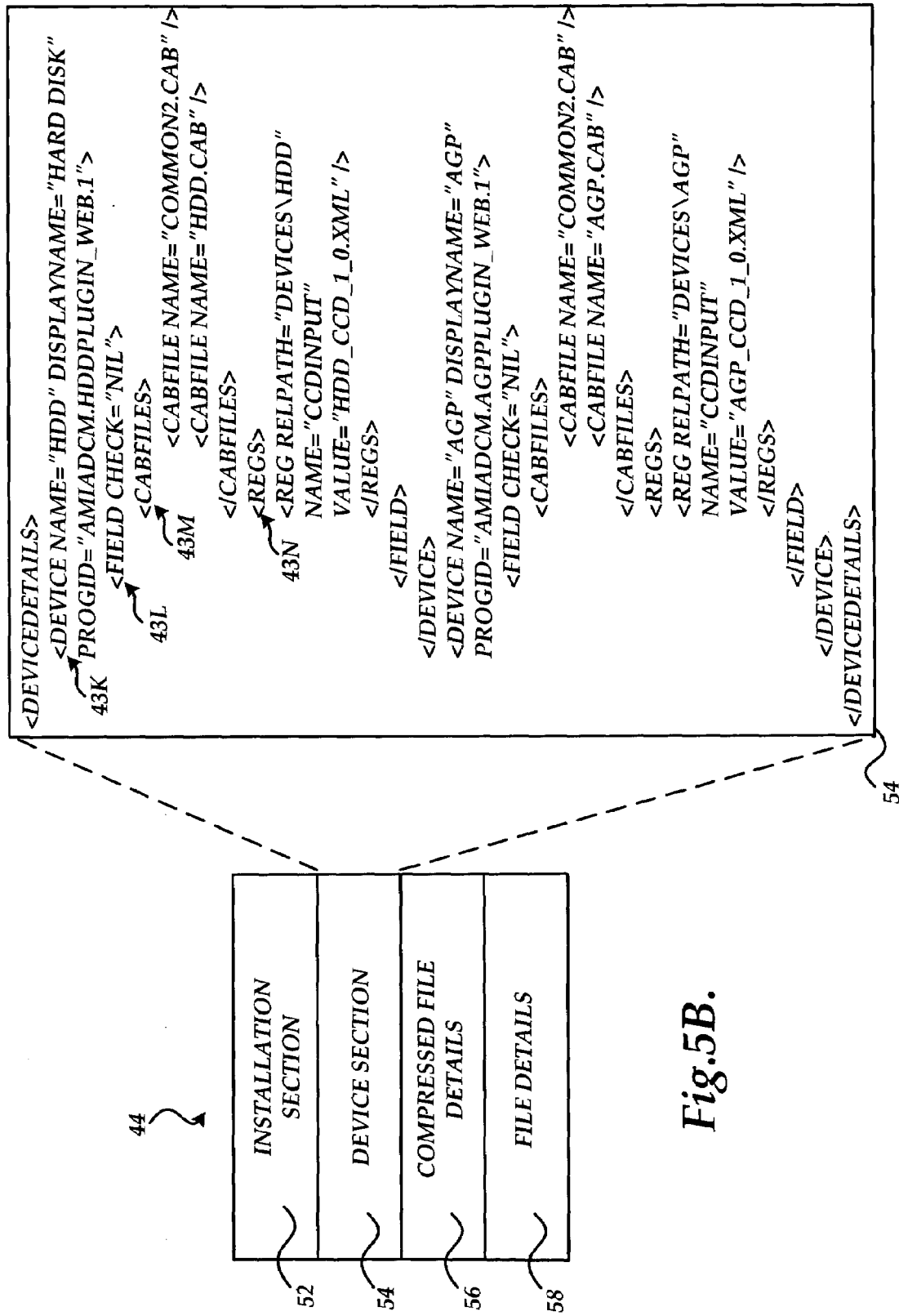
Figure 5C:
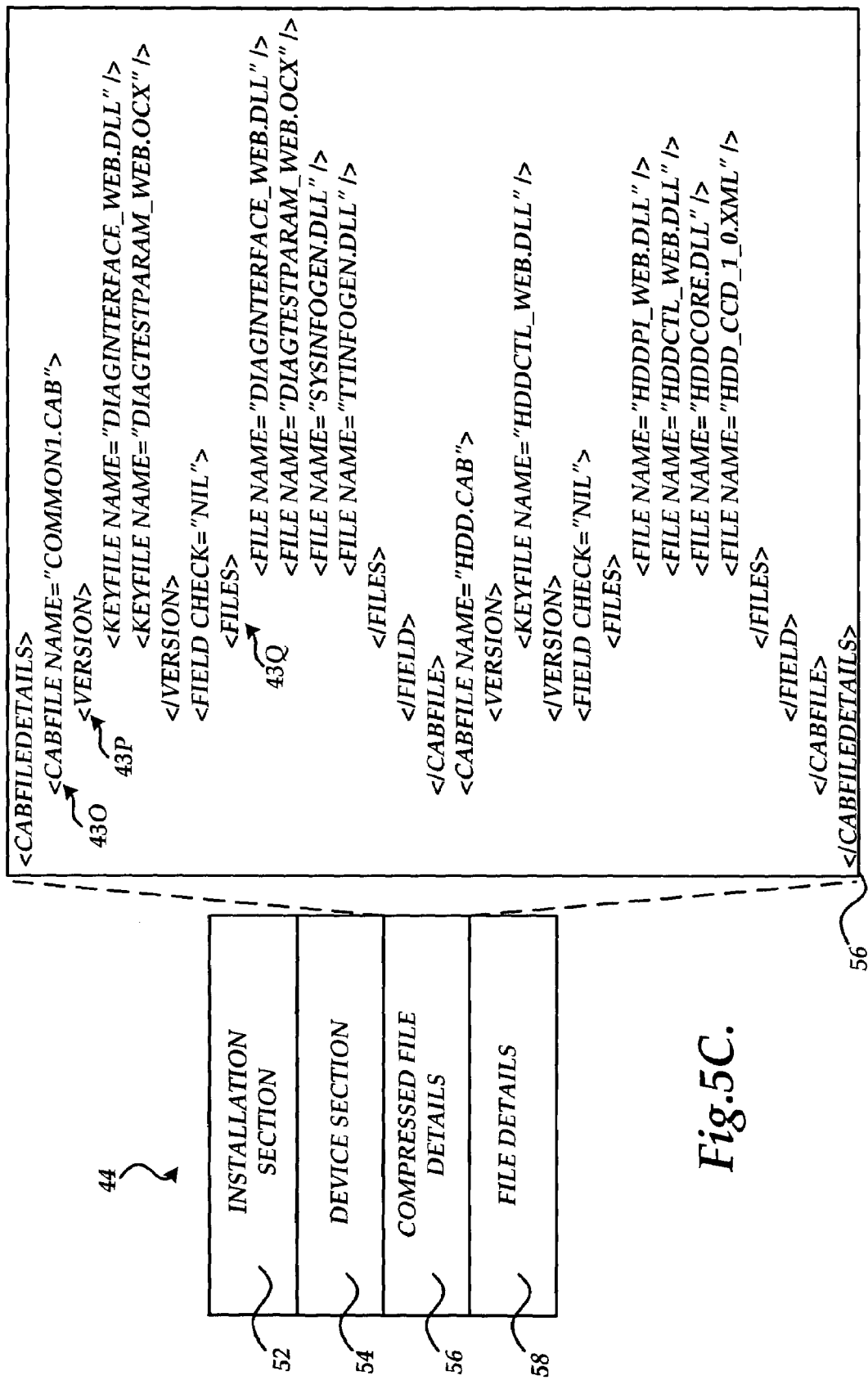
Figure 5D:
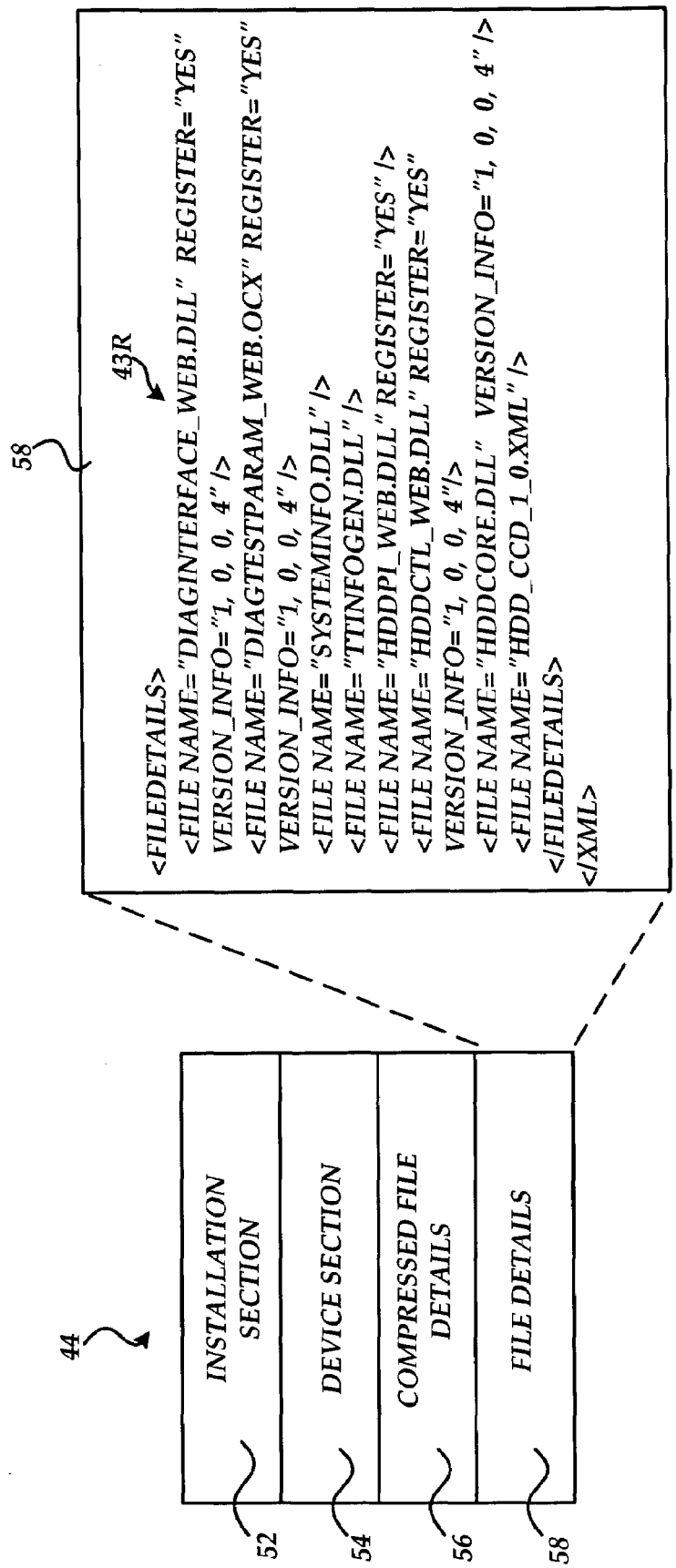
Figure 6A:
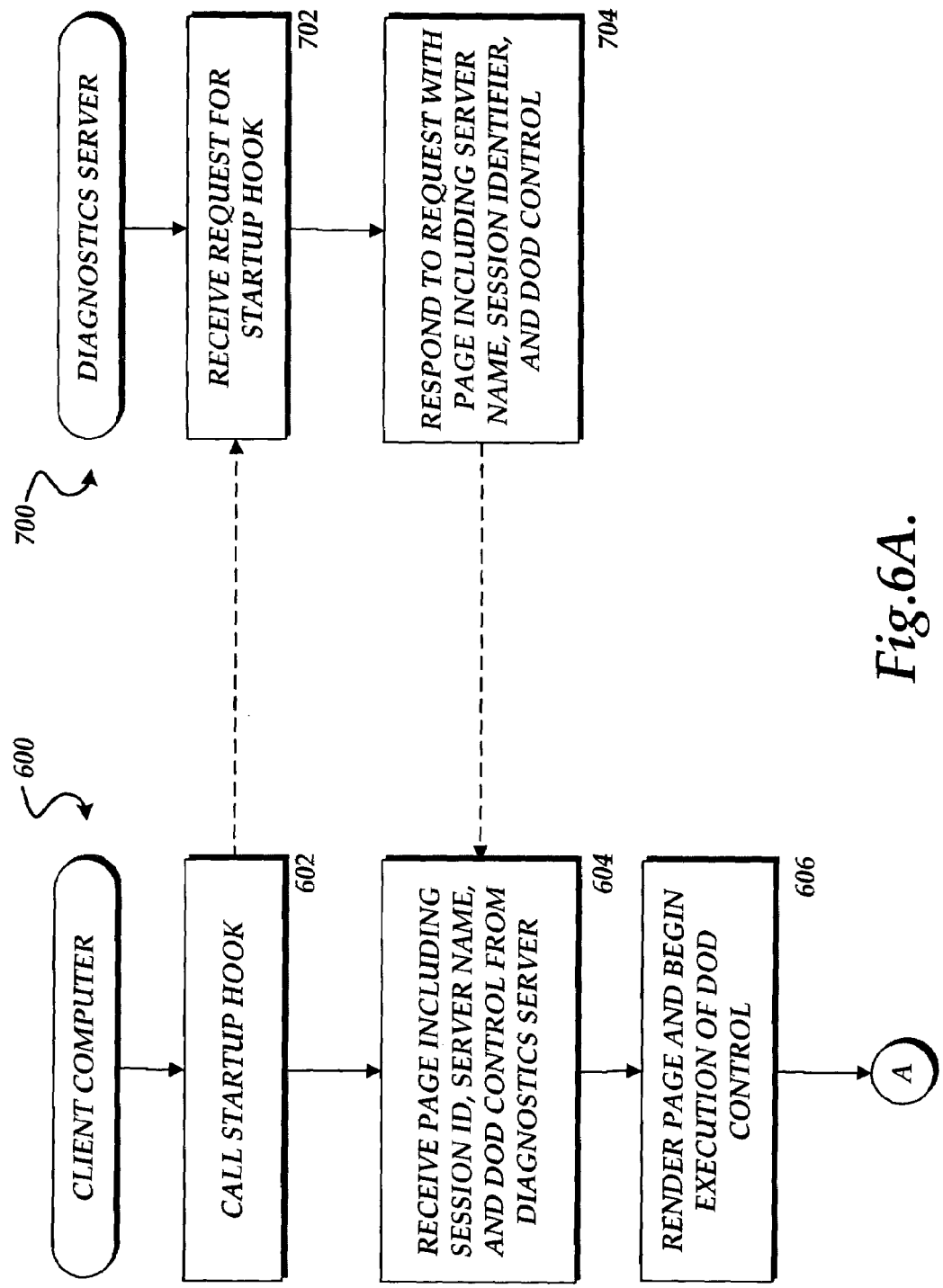
Figure 6B:
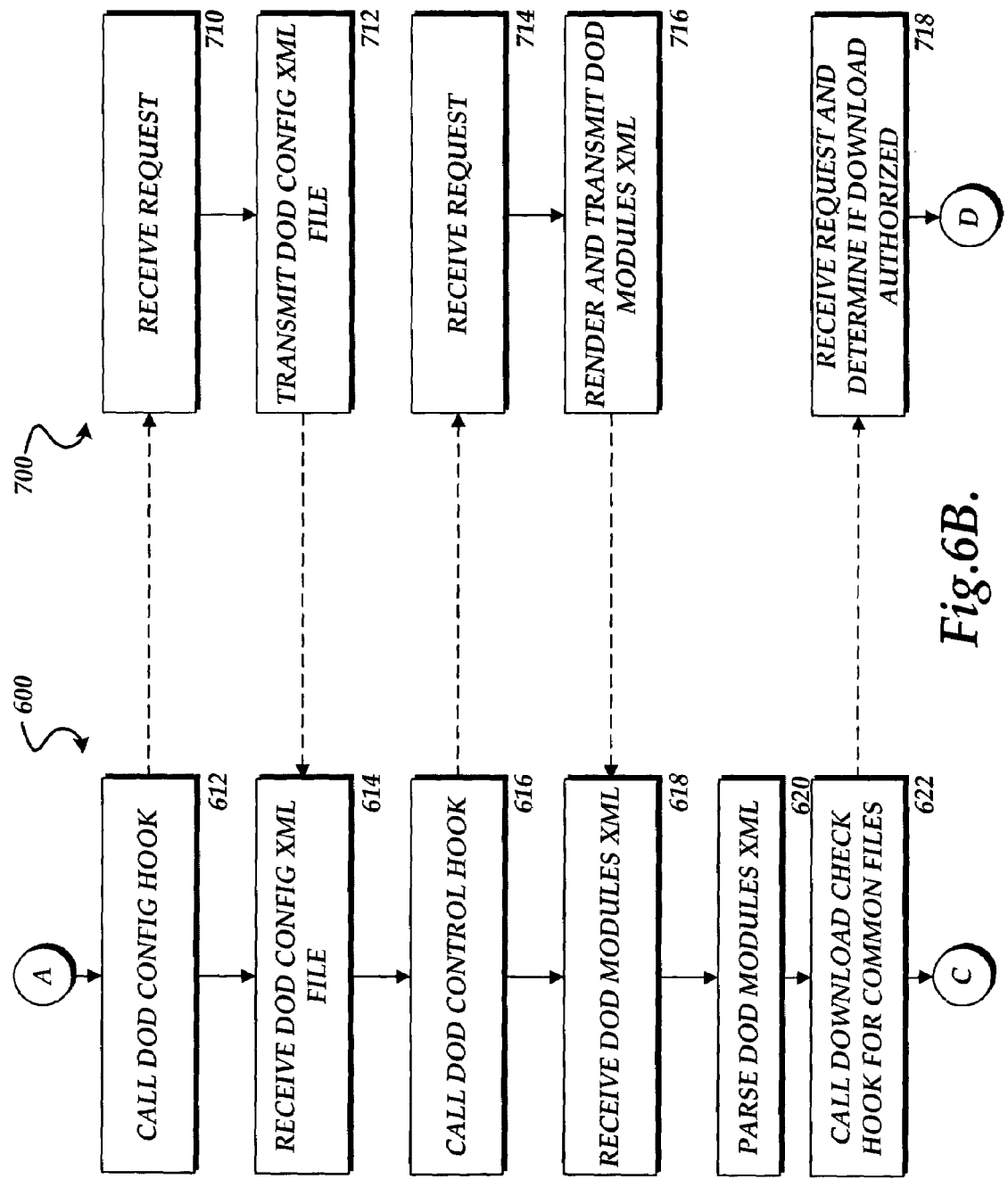
Figure 6C:
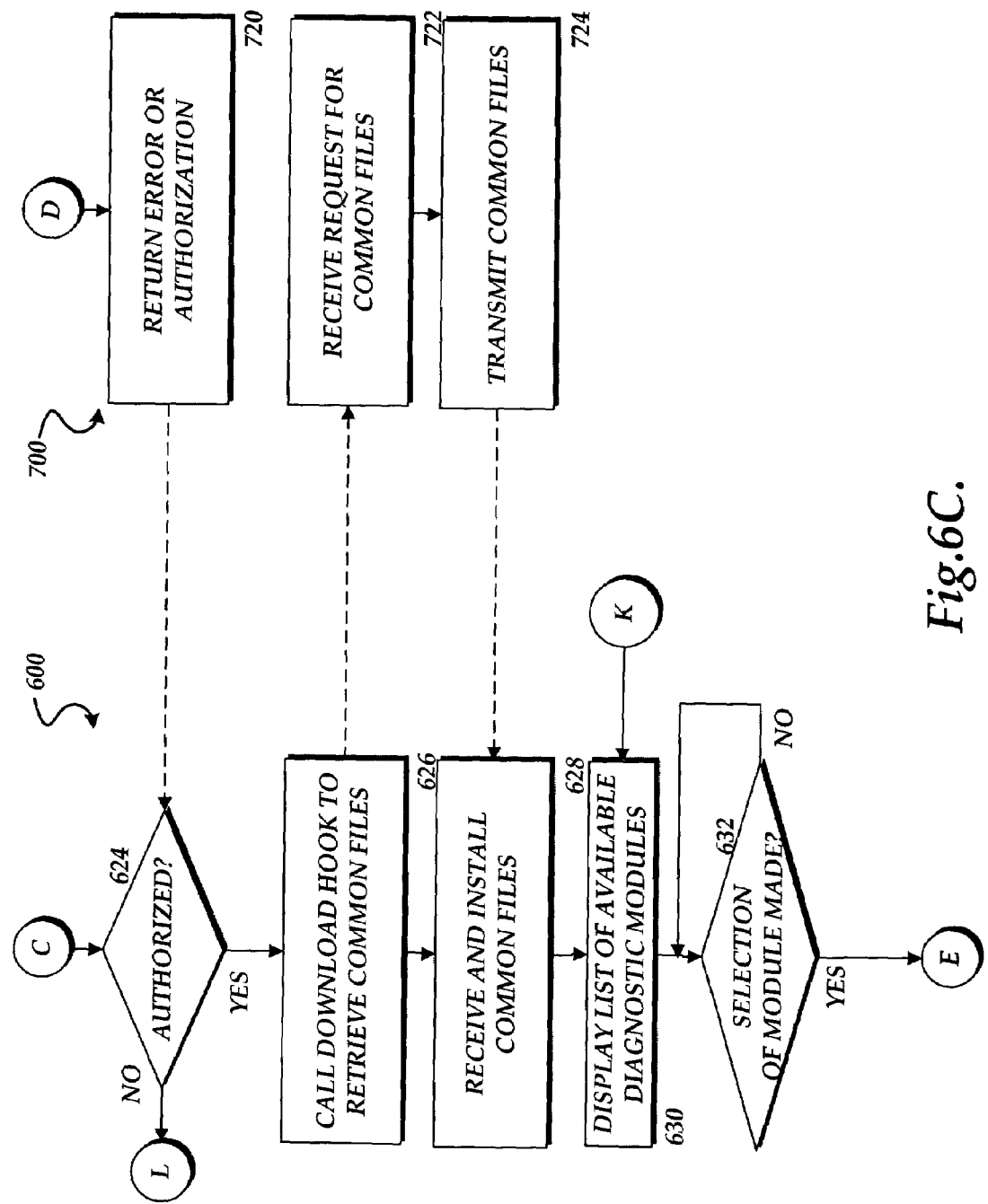
Figure 6D:
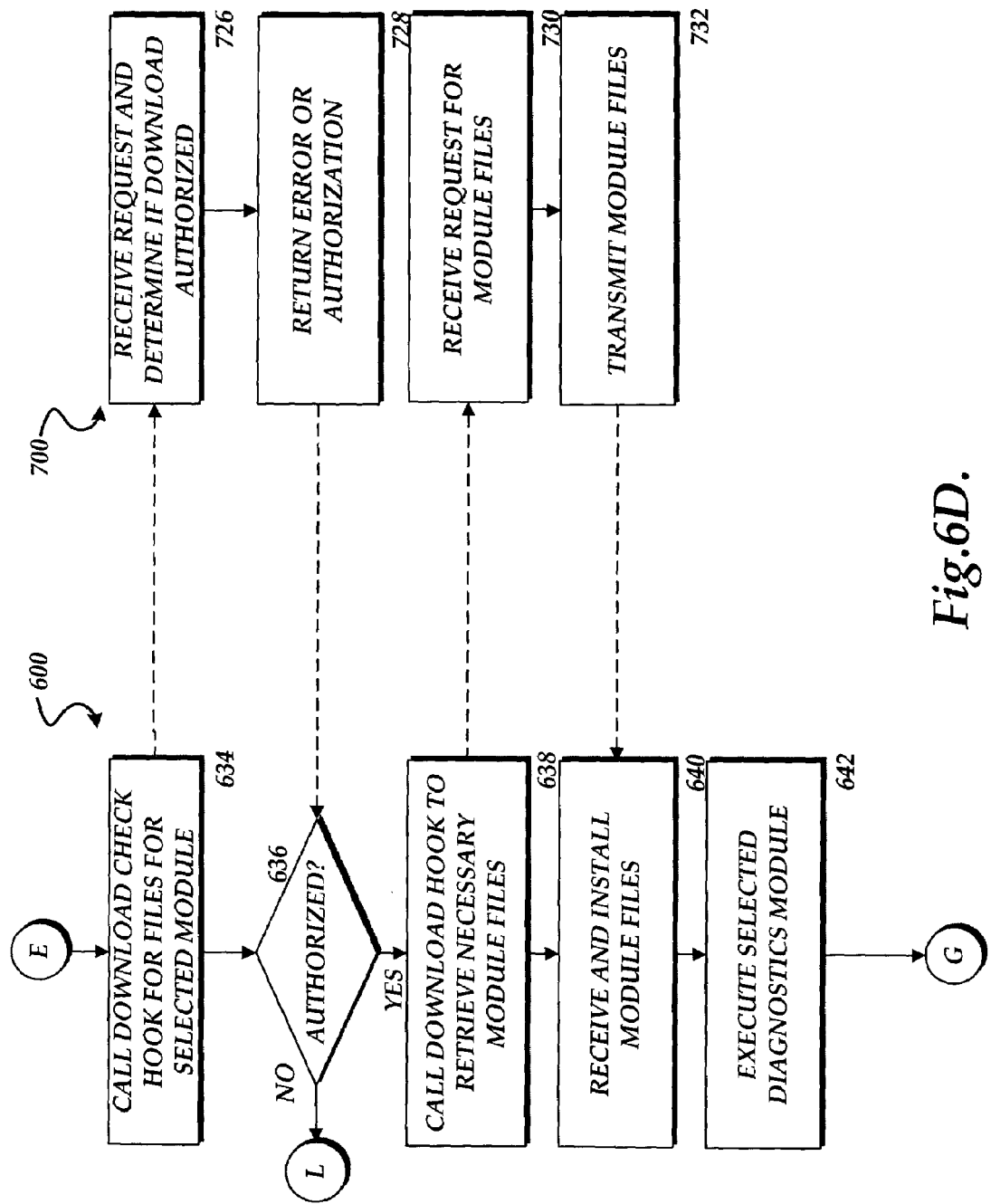
Figure 6F:
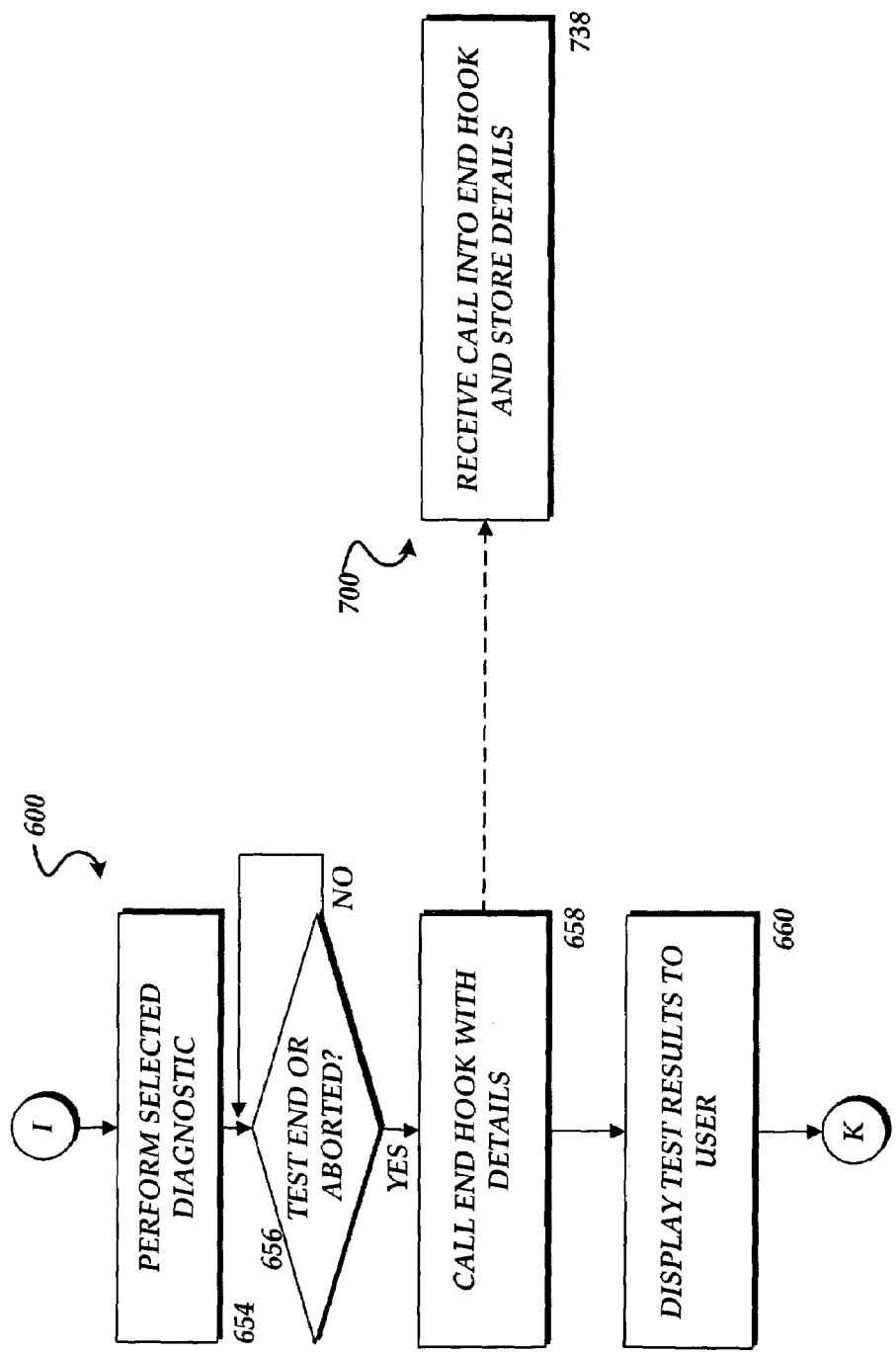

Referring now to FIGS. 5A-5D, additional details regarding the contents and use of the modules file 44 will be described. As discussed briefly above, the modules file 44 provides information to the diagnostics on-demand control 40 regarding the available diagnostics modules and information regarding the use and installation of these files. As shown in FIG. 5A, the modules file 44 is comprised of four separate sections. The installation section 52 is illustrated in FIG. 5A, the device section 54 is illustrated in FIG. 5B, the compressed file details 56 is illustrated in FIG. 5C, and the file details 58 is illustrated in FIG. 5D.

As shown in FIG. 5A, the installation section 52 comprises a number of data fields. In particular, the data field 43H identifies to the control 40 any files that are necessary for the installation and execution of all of the diagnostics modules 46. It should be appreciated that, according to one embodiment of the invention, the diagnostics modules 46 are stored on the server computer 30 as compressed files in cabinet (".CAB") form. However, it should be appreciated that these files may be stored individually or compressed using other types of compression methods. Accordingly, as shown in FIG. 5A, the installation section 52 identifies to the control 40 that a single compressed file named "COMMON1.CAB" is required for the use of all the diagnostics modules 46. In this manner, the files common to each of the diagnostics 46 may be downloaded prior to the use of any of the diagnostics modules 46.

The installation section 52 also includes a data field 43I that identifies to the diagnostics on-demand control 40 each of the diagnostics available to the client computer 2. As shown in FIG. 5A, only two devices are available for testing, the hard disk device and the advanced graphics processor device. It should be appreciated that the contents of the modules file 44 are merely illustrative and that in a typical scenario, many more devices would be available for testing at the client computer 2. The installation section 52 also includes a data field 43J that identifies to the control 40 each of the languages supported by the diagnostics modules 46.

As shown in FIG. 5B, the device section 54 provides details for each of the devices identified in field 43I. Accordingly, as shown in FIG. 5B, the device section 54 includes a data field 43K corresponding to the hard disk drive device. Another data field is also provided corresponding to the accelerated graphics port (".AGP") device.

Within the data field 43K corresponding to the hard disk device, there is a data field 43M which identifies to the control 40 each of the compressed files that must be retrieved and installed prior to performing the particular diagnostic on-demand. As shown in FIG. 5B, for instance, the compressed files "COMMON2.CAB" and "HDD.CAB" must be obtained from the server computer 30 and installed at the client computer 2 before the hard disk device may be tested.

As shown in FIG. 5B, the data field 43K also encompasses a data field 43N that identifies to the client computer one or more registry entries that must be added to the registry of the client computer during installation of the files identified in the data field 43M. Additionally, the data field 43K encompasses a data field 43L that identifies a condition that must be satisfied prior to installing the data files identified within the data field 43M. For instance, the data field 43L may indicate that a particular version of an operating system must be present prior to installation of these files. The data field 43L may also be utilized to satisfy other types of conditions prior to installing the files identified in the data field 43M. It should be appreciated that the device section 54 includes a data field 43K for each of the devices identified within the data field 43I and for each of these includes similar data fields 43L, 43M, and 43N.

As shown in FIG. 5C, the compressed file detail section 56 includes a data field 43O for each of the compressed files identified within the data fields 43H, 43M, described above. The data field 43O encompasses a data field 43Q that identifies to the control 40 each of the files contained within the compressed files. As shown within FIG. 5C, for instance, the compressed file "COMMON1.CAB" includes four compressed files. A similar entry is provided for the "HDD-.CAB" file and any other compressed file identified within the data fields 43M for each device or within the data field 43H for commonly utilized compressed files. A data file 43P may also be provided to act as a key file (or files) to determine whether or not current versions of the files contained within the compressed file are already present on the local system.

As shown in FIG. 5D, the file detail section 58 of the modules file 44 includes a number of data fields 43R corresponding to each of the files identified within the data field 43Q contained in the compressed file detail section 56. In this manner, file details may be provided for each of the files contained within each of the compressed files. As shown in FIG. 5D, the data file 43 identifies the particular file, includes an indication as to whether the file should be called to register itself after being copied onto the client computer 2, and includes version information. Version information may be utilized by the control 40 to ensure that an older version of a particular file does not overwrite a previous version. It may further be utilized by the control 40 to ensure that individual files are only downloaded from the server computer 30 when their version numbers are not up to date. This information may also be utilized by the control 40 when installing each of the files retrieved from the server computer 30.

The logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Referring now to FIGS. 6A-6F, an illustrative routine 600 will be described illustrating the operation of the client computer 2 for performing diagnostics on-demand in response to a user request. A routine 700 will also be described in conjunction with the routine 600 that illustrates the operation of a diagnostics server computer 30 for providing diagnostics on-demand services. It should be appreciated that the routine 600 is performed in response to a user request to perform a diagnostic test on a component of the client computer 2. Accordingly, the routine 600 begins execution in response to such a request.

The routine 600 begins at block 602 where the client computer 2 calls the start-up hook 38A made available by the diagnostics computer server 30. As described briefly above, the start-up hook 38A comprises a fixed network address supported by the diagnostics server computer 30 at which a client computer 2 may request the software components necessary to perform diagnostics on-demand. According to one embodiment of the invention, the start-up hook 38A may comprise a Web site.

The diagnostics server computer 30 receives the request from the client computer 2 for the start-up hook 38A at block 702. The routine 700 then continues to block 704, where the diagnostics server computer 30 responds to the request from the client computer with a Web page that includes the name of the server computer 30, a unique session identifier, and the diagnostics on-demand control 40. It should be appreciated that the unique session identifier is utilized by the client computer 2 and the diagnostics server computer 30 to maintain state during a diagnostics session.

At block 604, the client computer 2 receives the page from the diagnostics server computer 30, which includes the session identifier, the server name, and the diagnostics on-demand control. The routine 600 then continues to block 606 where the received page is rendered in the Web browser application 28, including execution of the diagnostics on-demand control 40. The routine 600 then continues to block 612.

At block 612, the diagnostics on-demand control 40 calls the diagnostics on-demand configuration hook 38B to retrieve the diagnostics on-demand configuration XML file 42. Accordingly, the server computer 30 receives the request from the client computer 2 at block 710. In response to the request, the server computer 30 transmits the configuration XML file to the diagnostics on-demand control 40 to block 712. The diagnostics on-demand configuration XML file 42 is received by the control 40 at block 614. As described, the diagnostics on-demand configuration XML file 42 identifies to the diagnostics on-demand control 40 the addresses of the hooks 38C-38H, described above with reference to FIG. 4.

Once the configuration XML file 42 has been retrieved from the server computer 30, the configuration file 42 may be utilized by the diagnostics on-demand control 40 to identify the diagnostics on-demand control hook 38C. Once the diagnostics on-demand control hook 38C has been identified, it is called by the diagnostics on-demand control 40 at block 616. As discussed briefly above, the diagnostics on-demand control hook 38C provides functionality for retrieving the diagnostics on-demand modules XML file 44 from the server computer 30. Accordingly, the request for the diagnostics on-demand control hook 38C is received at the server computer 30 at block 714. The server computer 30 then renders the modules XML file 44 and transmits the file to the diagnostics on-demand control 40. As discussed briefly above, the contents of the modules XML file 44 may be generated dynamically by the server computer 30 based on business logic implemented as code executing on the server computer 30.

At block 618, the diagnostics on-demand control 40 receives the modules XML file 44. The routine 600 then continues to block 620, where the diagnostics on-demand control 40 parses the modules XML file 44 to identify any compressed files needed prior to the execution of any of the diagnostics modules 46. As discussed above with respect to FIG. 5A, the common compressed files needed for each of the diagnostics modules 46 may be identified in the data field 43H.

Once the compressed files needed to execute any of the diagnostics modules 46 have been identified, the control 40 calls the download check hook 38E to obtain authorization to download the required files. This request is received by the server computer 30 at block 718. The request may include the unique session identifier or other information to identify the session and the diagnostics on-demand control 40. Based on this information, the server computer 30 is operative to determine whether the download of the requested files is authorized at block 718. Accordingly, at block 720, the server computer 30 returns to the diagnostics on-demand control 40 either authorization to download the requested file or an error message.

At block 624, the diagnostics on-demand control 40 determines whether download of the common files needed to execute any of the diagnostics modules 46 has been authorized. If the request has not been authorized, the routine 600 branches from block 624 to block 652. If, however, the request has been authorized, the routine 600 continues from block 624 to block 626.

At block 626, the diagnostics on-demand control 40 calls the download hook 38D to retrieve the commonly needed compressed files. The request is received at the server computer 30 at block 722 and a response is transmitted to the client computer at block 724. At block 628, the diagnostics on-demand control 40 receives the commonly needed compressed files and installs these files according to the instructions contained in the diagnostics on-demand modules XML file 44. The routine 600 then continues from block 628 to block 630.

At block 630, the diagnostics on-demand control 40 displays a list of available diagnostic modules. As described above and shown in FIG. 7, this list is based on the contents of the modules XML file 44 and includes each of the diagnostics modules that are made available to the control 40 by the server computer 30. In particular, the devices displayed are those identified in the data field 43I of the diagnostics on-demand modules XML file 44. A user is then permitted to select one of the diagnostics modules for execution on the client computer 2.

From block 630, the routine 600 continues to block 632, where a determination is made as to whether a selection of one of the displayed diagnostics modules has been made. If no selection has been made, the routine 600 branches back to block 632 for another determination. If, however, a selection of a diagnostics module has been made, the routine 600 continues from block 632 to block 634.

Once the selection has been made of a diagnostics module to execute, the diagnostics on-demand control 40 identifies the files needed to execute the selected module. This determination is based on the contents of the diagnostics on-demand modules XML file 44. Once these files have been identified, the control 40 calls the download check hook 38E to obtain authorization to retrieve the necessary files from the server computer 30. Accordingly, the server computer 30 receives the request at block 726 and determines whether the download is authorized. At block 728, the server computer 30 returns an error condition or authorization to download the requested files to the client computer 2.

At block 636, the control 40 determines whether or not the retrieval of the necessary files for the selected diagnostics module has been authorized by the server computer 30. If the retrieval has not been authorized, the routine 600 branches from block 636 to block 652. If, however, the retrieval has been authorized, the routine 600 continues to block 638 where the control 40 calls the download hook 38D to retrieve the files necessary to execute the selected diagnostics module. The server computer 30 receives the request at block 730 and in response, transmits the requested diagnostics module files to the client computer at block 732.

At block 640, the diagnostics on-demand control 40 receives the requested diagnostics modules from the server computer 30 and installs these files according to the instructions contained in the diagnostics on-demand modules XML file 44. In particular, existing versions on the client computer 2 having the same or version information will not be replaced, registry entries may be created, and the necessary files may be installed as long as the specified conditions are met. Once the files have been installed at block 640, the routine 600 continues to block 642.

At block 642, the selected diagnostics module is executed. As part of the execution, the diagnostics module may display one or more parameters and allow the user of the client computer 2 to adjust the default parameters as needed at block 644. An illustrative user interface for providing this functionality is shown in FIG. 7 and described above.

At block 646, a determination is made as to whether the user has selected the start button in order to start the execution of the selected diagnostics module. If the start button has not been selected, the routine 600 branches back to block 646, where another determination is made. If the start button has been selected, the routine 600 continues to block 646. At block 646, the diagnostics on-demand control 40 calls into the start hook 38F to obtain authorization to start the execution of the selected diagnostics module. Accordingly, the server computer 30 receives the request from the client computer 2 at block 734. In response to the request, the server computer 30 determines whether authorization should be provided to the client computer 2 to begin the execution of the diagnostics module. Accordingly, at block 736, the server computer 30 returns to the client computer 2 either authorization or denial to begin execution of the selected diagnostics module.

The response from the server computer 30 is received at the client computer 2 at block 648. The routine 600 then continues to block 650, where a determination is made as to whether authorization has been received from the server computer 30 to begin the execution of the selected diagnostics module. If authorization has not been provided, the routine 600 branches to block 652, where the error hook 38H is called by the diagnostics on-demand control 40. In response to the call to the error hook 38H, the server computer 30 may display an error message within the window provided by the Web browser application 28. If, however, authorization is received to begin the execution of a selected diagnostics module at block 650, the routine 600 then continues to block 654.

At block 654, execution of the selected diagnostics module is performed in order to perform the selected diagnostic test. As discussed above, this may include testing various software or hardware components of the client computer 2. The routine 600 continues from block 654 to block 656 where a determination is made as to whether the execution of the diagnostics module has completed or the test has been aborted. If the test has not completed or been aborted, the routine 600 returns to block 656 where the execution of the selected diagnostics module is continued. If the test has completed or been aborted, the routine continues from block 656 to block 658.

At block 658, the control 40 calls the end hook 38G with the results of the diagnostic test. This may include identifying to the server computer 30 any errors or malfunctions that were encountered during the performance of the test. This may also include providing for the server computer 30 information indicating whether the test completed successfully or unsuccessfully. This information is received at the server computer 30 at block 738 and may be stored in the database at the server computer 30 for future use.

From block 658 the routine 600 continues to block 660 where the test results are displayed to a user in the user interface window provided by the Web browser application 28. An illustrative graphical user interface for performing this function is described above and illustrated in FIG. 7. From block 660, the routine 600 returns to block 630, where a user is again permitted to select from the list of available diagnostics modules to perform diagnostic tests on various components within the client computer 2.

Based on the foregoing, it should be appreciated that the embodiments of the present invention provide methods, systems, and apparatus for providing on-demand computer diagnostics. It should be appreciated that embodiments of the invention allow a user to retrieve and execute program code for performing a diagnostic on a single component of a client computer 2 in response to a user request. It should also be appreciated that various embodiments of the invention provide a method, system, and apparatus for providing and utilizing server side entry points, or hooks, for use in diagnostics on-demand services. Moreover, methods and data structures are provided for use in providing on-demand computer diagnostics, such as the diagnostics on-demand configuration XML file 42 and the diagnostics on-demand modules XML file 44.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for providing and executing a diagnostics module in direct response to a user request, the method comprising:

receiving the request from the user to execute the diagnostics module;

in response to the user request, retrieving from a diagnostics server computer a control object operative to manage the installation and execution of the diagnostics module; and executing the control object, wherein execution of the control object comprises:

retrieving from the diagnostics server computer a configuration file containing data identifying one or more network addresses at the diagnostics server computer for communicating with the diagnostics server computer and a data file containing data describing how the diagnostics module should be installed on a client computer;

requesting, by way of a network address specified by the configuration file, permission to retrieve the diagnostics module from the diagnostics server computer;

in response to receiving permission to retrieve the diagnostics module, retrieving the diagnostics module from the diagnostics server computer at a network address specified by the configuration file;

installing the diagnostics module on the client computer according to data provided in the data file;

requesting, by way of a network address specified by the configuration file, permission to begin the execution of the diagnostics module; and executing the diagnostics module in response to receiving permission.

2. The method of claim 1, wherein the execution of the diagnostics module is performed in response to commands issued by the control object and wherein the diagnostics module comprises computer code executable only in response to commands issued by the control object.

3. The method of claim 2, wherein the diagnostics module comprises executable computer code capable of diagnosing failures or potential failures within a computer upon which it is executed.

4. The method of claim 3, wherein the control object is further operative to determine whether execution of the diagnostics module has completed, and to transmit data to the diagnostics server computer regarding the completion of the diagnostics module in response to the completion of the execution of the diagnostics module.

5. A method for providing and executing a diagnostics module comprising one or more executable files for diagnosing failures or potential failures within a client computer, the method comprising:

receiving a selection of the diagnostics module to be executed;

in response to the selection, retrieving from a diagnostics server computer a configuration file containing data identifying one or more network addresses at the diagnostics server computer for communicating with the diagnostics server computer and a data file containing data describing how the one or more files comprising the diagnostics module should be installed on the client computer;

determining, based on the contents of the data file, whether any of the executable files are common to two or more diagnostics modules;

in response to determining that one or more of the executable files are common to two or more diagnostics modules, retrieving the common executable files and installing the common executable files on the client computer;

receiving a request to start the execution of the diagnostics module, and in response thereto, requesting by way of a network address specified by the configuration file, permission to retrieve the diagnostics module from the diagnostics server computer;

in response to receiving permission to retrieve the diagnostics module, retrieving the diagnostics module from the diagnostics server computer at a network address specified by the configuration file;

installing the diagnostics module on the client computer according to data provided in the data file;

requesting, by way of a network address specified by the configuration file, permission to begin the execution of the diagnostics module; and executing the diagnostics module in response to receiving permission to execute the diagnostics module from the diagnostics server computer.

6. The method of claim 5, wherein the execution of the diagnostics module is performed in response to commands issued by a control object and wherein the diagnostics module comprises computer code executable only in response to commands issued by the control object.

7. The method of claim 6, wherein the diagnostics module comprises executable computer code capable of testing for failures or potential failures within the client computer.

8. The method of claim 7, further comprising determining whether execution of the diagnostics module has completed or canceled, and transmitting data to the diagnostics server computer regarding the completion of the diagnostics module in response to determining that execution of the diagnostics module has completed or been canceled.

9. A method for providing and executing a diagnostics module in direct response to a user request, the method comprising:

storing at a client computer a control object operative to retrieve the diagnostics module in response to the user request, to receive from a diagnostics server computer a data file containing data describing how the diagnostics module should be installed on the client computer, to store the diagnostics module at the client computer, to determine whether execution of the diagnostics module is authorized and, in response to determining that execution of the diagnostics module is authorized, to execute the diagnostics module, wherein retrieving the diagnostics module comprises transmitting a request to the diagnostics server computer for authorization to retrieve the diagnostics module, receiving authorization to retrieve the diagnostics module, transmitting a request to the diagnostics server computer for the diagnostics module in response to receiving the authorization to retrieve the diagnostics module and, receiving the diagnostics module from the diagnostics server computer, wherein storing the diagnostics module at the client computer comprises installing the diagnostics module at the client computer according to the data contained in the data file, wherein determining whether the execution of the diagnostics module is authorized comprises transmitting a request to the diagnostics server computer for authorization to execute the diagnostics module, and wherein the diagnostics module comprises computer code executable only in response to commands issued by the control object.

10. A method for providing and executing a diagnostics module in direct response to a user request, the method comprising:

storing at a client computer a control object operative to retrieve the diagnostics module in response to the user request, to receive from a diagnostics server computer a data file containing data describing how the diagnostics module should be installed on the client computer, to store the diagnostics module at the client computer, to determine whether execution of the diagnostics module is authorized, in response to determining that execution of the diagnostics module is authorized, to execute the diagnostics module, to determine whether execution of the diagnostics module has completed, and to transmit data to the diagnostics server computer regarding the execution of the diagnostics module in response to the completion of the execution of the diagnostics module, wherein retrieving the diagnostics module comprises transmitting a request to the diagnostics server computer for authorization to retrieve the diagnostics module, receiving authorization to retrieve the diagnostics module, transmitting a request to the diagnostics server computer for the diagnostics module in response to receiving the authorization to retrieve the diagnostics module and, receiving the diagnostics module from the diagnostics server computer, wherein storing the diagnostics module at the client computer comprises installing the diagnostics module at the client computer according to the data contained in the data file, wherein determining whether the execution of the diagnostics module is authorized comprises transmitting a request to the diagnostics server computer for authorization to execute the diagnostics module, and wherein the diagnostics module comprises computer code executable only in response to commands issued by the control object.

11. A computer storage medium having stored thereon computer executable instructions which, when executed by a computer, cause the computer to:

receive a request from a user to execute a diagnostics module;

in response to the user request, retrieve from a diagnostics server computer a control object operative to manage the installation and execution of the diagnostics module; and execute the control object, wherein execution of the control object comprises:

retrieving from the diagnostics server computer a configuration file containing data identifying one or more network addresses at the diagnostics server computer for communicating with the diagnostics server computer and a data file containing data describing how the diagnostics module should be installed on the computer;

requesting, by way of a network address specified by the configuration file, permission to retrieve the diagnostics module from the diagnostics server computer;

in response to receiving permission to retrieve the diagnostics module, retrieving the diagnostics module from the diagnostics server computer at a network address specified by the configuration file;

installing the diagnostics module on the computer according to data provided in the data file;

requesting, by way of a network address specified by the configuration file, permission to begin the execution of the diagnostics module; and executing the diagnostics module in response to receiving permission.

12. The computer storage medium of claim 11, wherein the execution of the diagnostics module is performed in response to commands issued by the control object and wherein the diagnostics module comprises computer code executable only in response to commands issued by the control object.

13. The computer storage medium of claim 11, wherein the diagnostics module comprises executable computer code capable of diagnosing failures or potential failures within a computer upon which it is executed.

14. The computer storage medium of claim 11, wherein the control object is further operative to determine whether execution of the diagnostics module has completed, and to transmit data to the diagnostics server computer regarding the completion of the diagnostics module in response to the completion of the execution of the diagnostics module.

15. A system for providing and executing a diagnostics module in direct response to a user request, the system comprising:

a memory device for storing a program for providing and executing a diagnostics module in direct response to a user request; and a processor, functionally coupled to the memory device, the processor being responsive to computer-executable instructions contained in the program and operative to:

receive the request from the user to execute the diagnostics module;

in response to the user request, retrieve from a diagnostics server computer a control object operative to manage the installation and execution of the diagnostics module; and execute the control object, wherein execution of the control object comprises:

retrieving from the diagnostics server computer a configuration file containing data identifying one or more network addresses at the diagnostics server computer for communicating with the diagnostics server computer and a data file containing data describing how the diagnostics module should be installed on the system;

requesting, by way of a network address specified by the configuration file, permission to retrieve the diagnostics module from the diagnostics server computer;

in response to receiving permission to retrieve the diagnostics module, retrieving the diagnostics module from the diagnostics server computer at a network address specified by the configuration file;

installing the diagnostics module on the system according to data provided in the data file;

requesting, by way of a network address specified by the configuration file, permission to begin the execution of the diagnostics module; and executing the diagnostics module in response to receiving permission.

16. The system of claim 15, wherein the execution of the diagnostics module is performed in response to commands issued by the control object and wherein the diagnostics module comprises computer code executable only in response to commands issued by the control object.

17. The system of claim 15, wherein the diagnostics module comprises executable computer code capable of diagnosing failures or potential failures within a computer upon which it is executed.

18. The system of claim 15, wherein the control object is further operative to determine whether execution of the diagnostics module has completed, and to transmit data to the diagnostics server computer regarding the completion of the diagnostics module in response to the completion of the execution of the diagnostics module.

* * * * *